Sept. 5, 1950     R. J. SAMPSON ET AL     2,521,129
AUXILIARY RADIO FOR AUTOMOBILES AND CIRCUIT THEREFOR
Filed Oct. 18, 1947
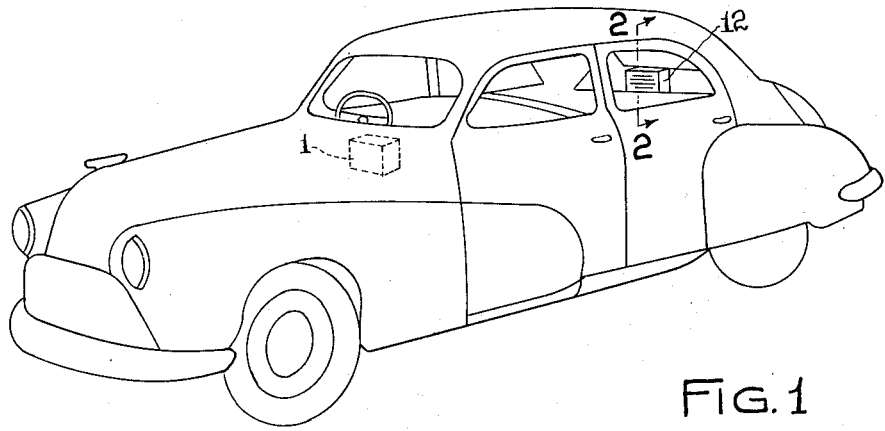
FIG. 1
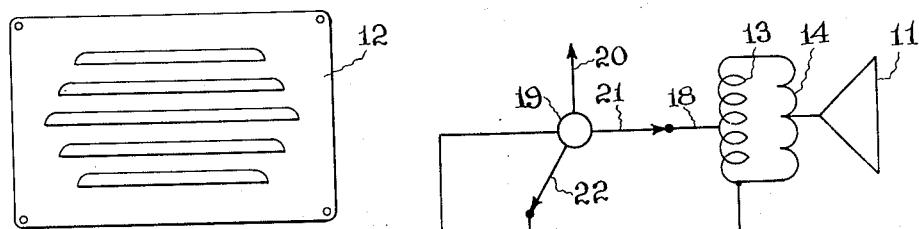
FIG. 2     FIG. 3
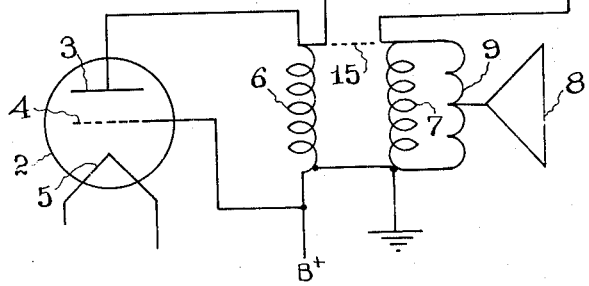
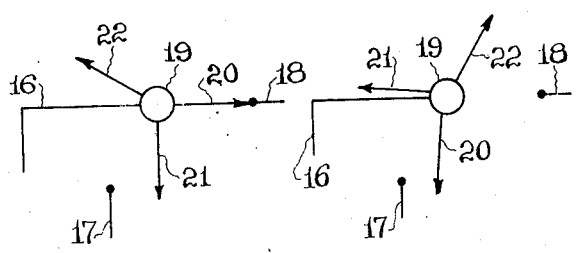
FIG. 4     FIG. 5
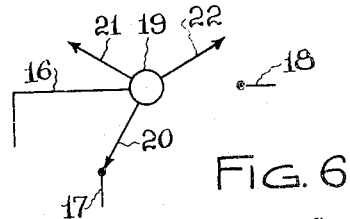
FIG. 6
INVENTORS.
RICHARD J. SAMPSON
BY ELMER A. GATZKE
ATTORNEY Patented Sept. 5, 1950

2,521,129

UNITED STATES PATENT OFFICE 2,521,129

AUXILIARY RADIO FOR AUTOMOBILES AND CIRCUIT THEREFOR

Richard J. Sampson and Elmer A. Gatzke, Cleveland, Ohio

Application October 18, 1947, Serial No. 780,682

1 Claim. (Cl. 250—20)

This invention relates, as indicated, to an auxiliary radio for automobiles and the like, but has reference more particularly to an auxiliary loud speaker arrangement, a circuit and switch for such speaker.

It is customary to install radio sets in automobiles in the front part of the car beneath the cowl. The loud speaker of the radio set is likewise ordinarily disposed adjacent or near the radio set.

In order for the occupants of the rear seat of the automobile, particularly in the case of a sedan, to hear the radio, it is necessary for the driver or other occupants of the front seat, to increase the volume of the radio set to a point where it is annoying to the occupants of the front seat, and often disconcerts the driver of the car to such an extent as to constitute a hazard to safe driving.

The present invention has, as its primary object, the provision of an auxiliary loud speaker for automobiles, particularly of the sedan type, which is so mounted and so connected with the principal radio set of the automobile, as to have the following advantages:

(a) It is mounted in a position in the rear part of the car which is closely adjacent the occupants of the rear seat, so that it may be heard by the rear seat occupants even when the volume of the speaker of the principal radio set is low.

(b) It can be operated independently of the speaker of the principal radio set, so that the volume of the auxiliary speaker can be adjusted to a point where the auxiliary speaker is scarcely heard by the occupants of the front seat of the car.

(c) It is connected to the principal radio set in such a manner that it can be entirely cut off from the principal radio set, in which case it need not be used when there are no rear seat occupants in the car.

(d) It may be easily and quickly installed in an automobile, with a minimum of labor, and at relatively small cost, the installation requiring a circuit and novel switch which, in themselves, are relatively inexpensive.

Other objects and advantages of the invention will be apparent during the course of the following description.

In the accompanying drawings, forming a part of this specification, and in which like numerals are employed to designate like parts throughout the same, Fig. 1 is a view which illustrates, in a more or less diagrammatic manner, the positions of the principal radio set and auxiliary speaker of the present invention, in an automobile of the sedan type;

Fig. 2 is a front elevational view of a louvered panel upon which the auxiliary loud speaker of the present invention is mounted, as viewed in the direction indicated by the line 2—2 of Fig. 1;

Fig. 3 is a circuit diagram, showing the connection of the auxiliary speaker to the principal radio set of the automobile, and showing also the position of the switch when both the principal and auxiliary loud speakers are on;

Fig. 4 is a diagrammatic view, showing the position of the switch when only the auxiliary loud speaker is on;

Fig. 5 is a diagrammatic view, showing the position of the switch when neither speaker is on, and Fig. 6 is a diagrammatic view, showing the position of the switch when only the principal speaker is on.

Referring more particularly to the drawings, reference numeral 1 denotes the principal radio set of an automobile, which is usually mounted in the front part of the automobile, beneath the cowl. This radio set conventionally includes a number of electronic tubes, the last of which is represented by the numeral 2 in Fig. 3, said tube comprising a plate 3, a screen or grid 4 and a filament 5. The primary coil of the output transformer of such set is represented by reference numeral 6, the secondary coil of such transformer by reference numeral 7, and the voice coil of the principal speaker 8 by reference numeral 9.

The auxiliary loud speaker of the present invention, which is denoted in Fig. 3 by reference numeral 11, is mounted on a louvered panel 12 (Figs. 1 and 2), and is preferably located on the shelf which is just behind the rear seat of the automobile, at a position as shown in Fig. 1. The secondary transformer coil for the auxiliary speaker is designated in Fig. 3 by reference numeral 13, and the voice coil of said speaker by reference numeral 14.

In connecting the auxiliary speaker to the principal radio, the line 15 between the primary and secondary of the output transformer of the principal radio set is cut, and a pair of wires 16 and 17 run from the ends of such cut line. A third wire, indicated at 18, is run to the secondary coil 13 of the auxiliary speaker 11.

A four-throw, three pole switch 19 is then inserted between the wires 16 and 18, being preferably mounted on the instrument panel of the automobile, in a position which is readily accessible to the driver or other occupant of the front seat of the automobile, although this switch may be mounted in any other convenient position within the automobile. The poles of the switch are designated by reference numerals 20, 21 and 22.

The wire 16 is permanently connected to the common or central terminal of the switch.

With the switch 19 in the position shown in Fig. 3, the pole 21 is connected to the wire 18, and the pole 22 to the wire 17, so that both speakers 8 and 11 are connected to the principal radio set, and the speakers will thus operate as a unit. Since the auxiliary speaker 11 is in operation, the volume of the radio set may be lowered to a point at which the occupants of the rear seat can hear without effort or straining, even when the volume of the set is very low. This will eliminate driving hazards due to blasting or high volume of the principal speaker.

With the switch 19 in the position shown in Fig. 4, only the pole 20 is connected to the wire 18, the poles 21 and 22 being open, so that only the auxiliary speaker will be connected to the radio set. This position of the switch is desirable when only the occupants of the rear seat wish to hear the radio. The volume, in this case, may be adjusted to a point where the set is heard only by the rear seat occupants, the front seat occupants scarcely hearing the radio.

With the switch 19 in the position shown in Fig. 5, all of the poles of the switch are open, and neither the principal nor the auxiliary speaker are connected to the radio set.

With the switch 19 in the position shown in Fig. 6, the pole 20 of the switch is connected to the wire 17, and the poles 21 and 22 are open, so that only the principal speaker of the radio is connected to the set.

It is apparent therefore that we have provided an auxiliary speaker, circuit and switch which fulfils all of the objects hereinbefore stated.

It is to be understood that the form of our invention, herewith shown and described, is to be taken as a preferred example of the same, and that various changes in the shape, size and arrangement of parts may be resorted to, without departing from the spirit of our invention, or the scope of the subjoined claim.

We claim:

In combination with a sedan type automobile, a radio receiving set located in the forward part of the automobile, said receiving set including a principal loud speaker unit, an auxiliary loud speaker unit mounted in the rearward part of said automobile, said principal speaker and said auxiliary speaker being electrically connected in parallel, and manually operable means for selectively connecting one or the other or both of said loud speaker units to said radio receiving set, said means comprising angularly spaced contact terminals, one of said terminals connecting to said auxiliary loud speaker circuit, and the other of said terminals connecting to said principal loudspeaker circuit, and a three pole rotary switch connected in series with the output transformer of said receiving set, the angularity between a pair of said poles being equal to the angularity between said contact terminals and the angularity between another pair of said poles being less than the angularity between said contact terminals whereby rotation of said switch is effective to sequentially connect first one, then the other, then both of said loud speaker units to said receiving set.

RICHARD J. SAMPSON.
ELMER A. GATZKE.

REFERENCES CITED

The following references are of record in the file of this patent:

UNITED STATES PATENTS

| Number | Name | Date |
| --- | --- | --- |
| 1,658,825 | Wolf | Feb. 14, 1928 |
| 1,732,451 | Walters | Oct. 22, 1929 |
| 1,768,299 | Simon | June 24, 1930 |
| 1,896,847 | Lieberum | Feb. 7, 1933 |
| 1,983,759 | Houston | Dec. 11, 1934 |
| 2,054,933 | Frazier | Sept. 22, 1936 |
| 2,176,732 | Faber | Oct. 17, 1939 |

OTHER REFERENCES

Auto-Radio Service Manual, vol. 1, 1933, Gernsback Publication, Inc., page 61.